E. SCHNEIDER, DEC'D.
S. SCHNEIDER, ADMINISTRATRIX.
CHAIN.
APPLICATION FILED MAY 11, 1918.
1,327,925.
Patented Jan. 13, 1920.
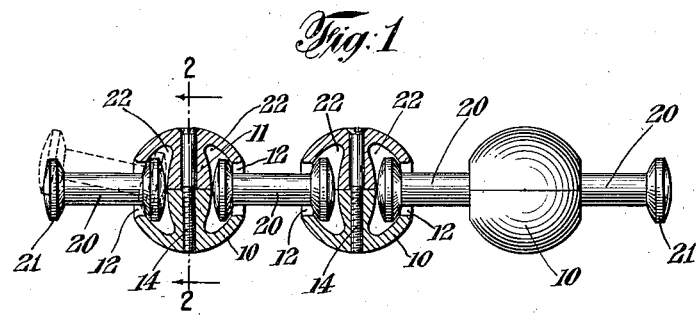
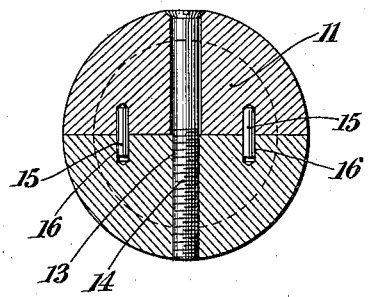
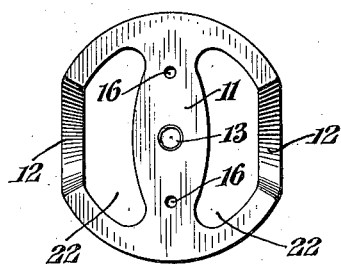
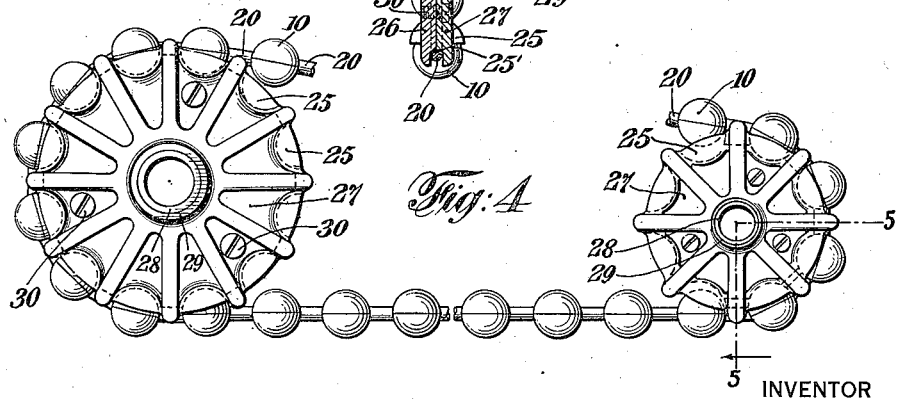
INVENTOR
Eberhard Schneider
BY
ATTORNEY

UNITED STATES PATENT OFFICE.

EBERHARD SCHNEIDER, OF NEW YORK, N. Y.; STANISLAWA SCHNEIDER ADMINISTRATRIX OF SAID EBERHARD SCHNEIDER, DECEASED.

CHAIN.

1,327,925.  Specification of Letters Patent.  Patented Jan. 13, 1920.

Application filed May 11, 1918. Serial No. 233,827.

*To all whom it may concern:*

Be it known that I, EBERHARD SCHNEIDER, a citizen of the United States, and a resident of New York, in the county of New York and State of New York, have invented certain new and useful Improvements in Chains, of which the following is a specification.

The invention relates to a flexible chain, which may be endless or broken, and is suitable for drive or other purposes. It has for its object to provide a chain of this type of particularly substantial construction, and which may be readily and inexpensively manufactured. To this end, the invention consists in uniting a plurality of properly designed spherical members by means of suitable links, free to rotate on their axes and free to assume any desired position at an angle to the normal axis of the chain, thereby rendering the entire chain flexible and capable of engagement at various angles, as well as resulting in uniform wear of the various parts thereof.

In the accompanying drawings, which illustrate the invention—

Figure 1 illustrates a length of chain, with a portion thereof shown in section.

Fig. 2 is a transverse section taken on the line 2—2, Fig. 1.

Fig. 3 is an interior view of one of the halves composing the spherical members.

Fig. 4 illustrates in side elevation the transmission of motion and power by means of the improved chain and sprocket.

Fig. 5 is a sectional view taken on the line 5—5, Fig. 4.

Similar characters of reference designate corresponding parts throughout the several views.

Referring to Figs. 1 to 3 of the drawings, the ball members 10 are shown in the nature of hollow spheres composed of two similar halves having preferably a central dividing and reinforcing wall 11 of substantial proportions, said spheres affording suitable apertures 12 at the poles. The two halves may be united in any suitable manner, for example, by having one of the central dividing portions drilled, and the other tapped, as at 13, to receive a suitable screw 14 or the like, which passes through the former and has its head countersunk in the outer surface thereof, as shown. I do not desire to limit myself to the particular means disclosed for uniting the two halves, as various other well-known expedients may be employed for this purpose. Moreover, to counteract any tendency of lateral shift between the halves, as well as to assist in accurately locating the parts, coöperating pins 15 and sockets 16 may be provided therein.

To secure successive spherical members to one another to make up the chain, links 20, having rounded integral heads or flange portions 21 at each end, are employed, the same extending into the polar cavities 22 of successive spheres, and the flange portions being retained by the wall portions of said spheres. The innermost faces of these ends or flange portions are preferably convex and just clear the rounded central wall portions 11, while the portion adjoining the inner wall of the shell is rounded substantially to conform to the curvature thereof. The stem of the link portions, projecting through the apertures or openings, is thus free to rotate upon its axis, and has the necessary degree of freedom angularly, being confined to a predetermined limited movement, as indicated in dotted lines, Fig. 1 of the drawings. There is also a slight end play allowable, and a ball and socket joint is afforded by this means of connection, which renders the chain particularly flexible, and which is secured substantially against the entry of dirt and foreign material. Furthermore, the parts are similar and readily replaceable, and the chain as a whole is of the greatest possible strength.

The chain may be used in connection with various types of sprocket and like wheels, for example, as indicated in Fig. 4, suitable cavities or cups 25 being provided by these wheels to receive the spherical surfaces of the ball members 10. Particularly for larger sizes of these members, a convenient form of wheel may be provided by forming of two plates 26 and 27, Fig. 5, wheel halves having outwardly depressed portions at the circumference to provide the semi-spherical cups 25 or the like for the reception of the ball members. Between the cups 25, channels 25' are formed to receive freely the links 20. The one plate is centrally extended, furthermore to provide a tubular hub 28 or the like, and the other to provide a similar sleeve portion 29 of larger diameter than the said hub portion of the former. Sleeve 29 is then fitted over the hub 28 and the plates secured to each other, as by screws 30, in position to form the cups 25.

I claim:

1. A chain, comprising: a series of hollow spherical members having a central solid portion, and polar cavities terminating in apertures; and suitable link members, the stems thereof passing through said apertures and having integral heads fitting within said polar cavities.

2. A chain, comprising: a series of hollow spherical members composed of two spherical halves suitably united and having a central solid portion, and polar cavities terminating in apertures; and suitable link members, the stems thereof passing through said apertures and having heads fitting within said polar cavities.

3. A chain, comprising: a series of hollow spherical members composed of two spherical halves suitably united and having a central solid portion, and polar cavities terminating in apertures; means to locate said halves and prevent motion of one relatively to the other; and suitable link members, the stems thereof passing through said apertures and having heads fitting within said polar cavities.

4. A chain, comprising: a series of hollow spherical members composed of two spherical halves suitably united and having a central convex solid portion, and polar cavities terminating in apertures; and suitable link members, the stems thereof passing through said apertures and having heads fitting within said polar cavities, convex on their inner faces and, at the portions adjoining the inner wall of the spherical members, being rounded to conform to the curvature thereof.

5. The combination with a chain composed of a plurality of spherical members flexibly united; of a wheel composed of plate members having circumferential depressions coöperating to form suitable cups to receive said spherical members, the one plate being centrally extended to provide a tubular hub, and the other centrally extended to provide a sleeve fitting over said hub, and means to unite said plates.

Signed at New York, in the county of New York and State of New York, this 9th day of May, A. D. 1918.

EBERHARD SCHNEIDER.